Aug. 9, 1960 M. P. WINTHER ET AL 2,948,370
SYNCHRONIZING MEANS FOR TORQUE TRANSMITTING DEVICE
Filed April 4, 1956 3 Sheets-Sheet 1
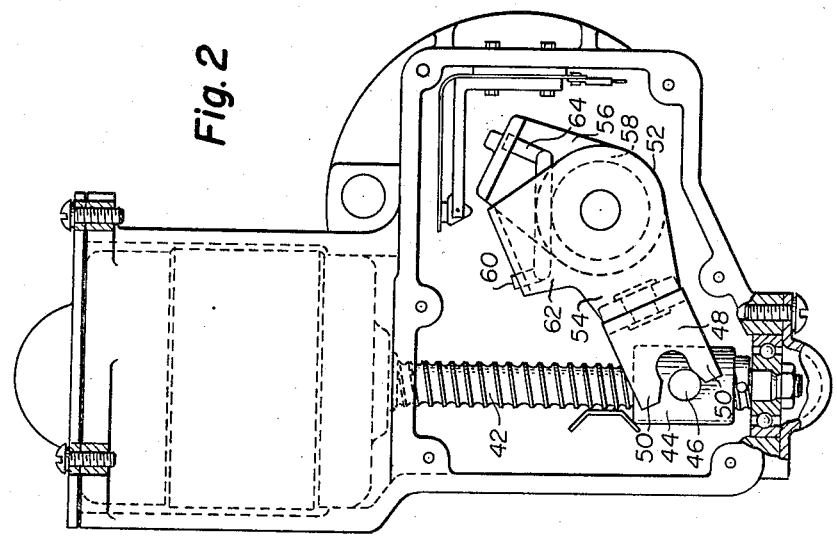
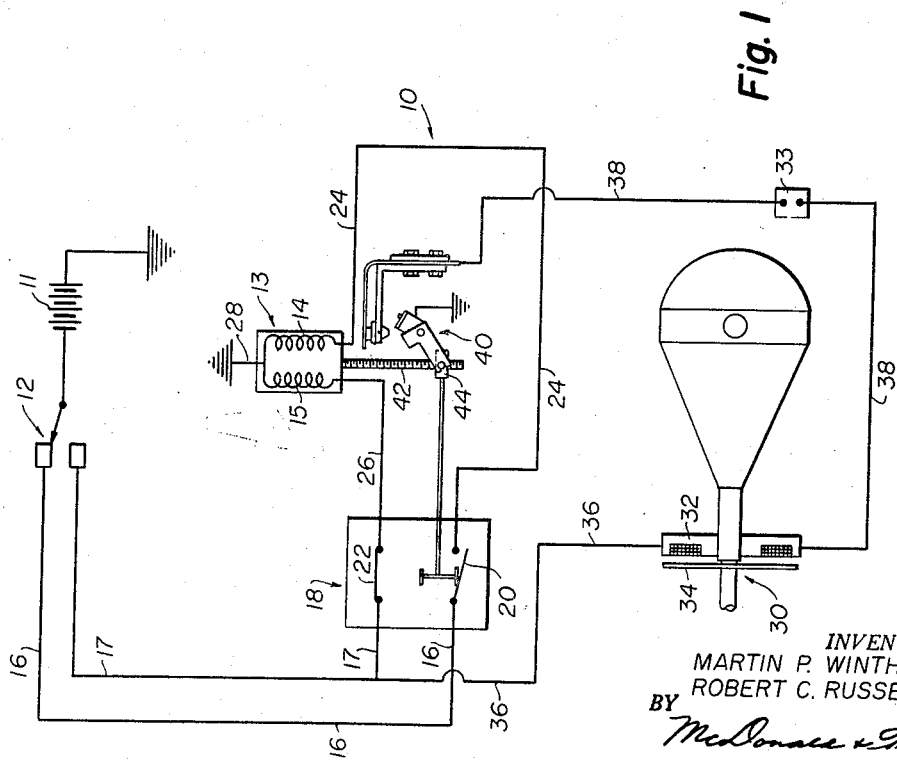
INVENTORS:
MARTIN P. WINTHER
ROBERT C. RUSSELL
BY *McDonald & Feagens*
ATTORNEYS

INVENTORS:
MARTIN P. WINTHER
ROBERT C. RUSSELL

ATTORNEYS

Aug. 9, 1960 M. P. WINTHER ET AL 2,948,370
SYNCHRONIZING MEANS FOR TORQUE TRANSMITTING DEVICE
Filed April 4, 1956 3 Sheets-Sheet 3

INVENTORS:
MARTIN P. WINTHER
ROBERT C. RUSSELL
BY
ATTORNEYS

United States Patent Office 2,948,370
Patented Aug. 9, 1960

2,948,370

SYNCHRONIZING MEANS FOR TORQUE TRANSMITTING DEVICE

Martin P. Winther, Gate Mills, and Robert C. Russell, Shaker Heights, Ohio, assignors to Eaton Manufacturing Company, Cleveland, Ohio, a corporation of Ohio Filed Apr. 4, 1956, Ser. No. 576,168

16 Claims. (Cl. 192—4)

The present invention relates to a device which facilitates gear shifting in a wide gear range multiple speed axle.

In a two speed axle having a wide range between the low speed ratio and the high speed ratio, the problem of synchronization of the rotating members is presented. When the axle is shifted from high speed ratio to low speed ratio, no appreciable difficulty is encountered. After a pre-selection is made for a shift from high speed ratio to low speed ratio, the shift is completed by either closing and opening the throttle very quickly, or by disengaging and engaging the clutch very rapidly with the throttle open.

The shift from low range to high range presents additional problems because the relatively moving members to be clutched together to attain the high speed ratio are in such a relative rotative relationship that the propeller shaft must be reduced in speed until the members to be clutched are rotating synchronously and therefore, when shifting from low speed ratio to high speed ratio, the propeller shaft must be retarded. If the propeller shaft is allowed to decelerate at its normal rate without any additional retardation, a prohibitive time lag is introduced before the shift can be effected and all of the advantage gained from the two speed axle is lost because of the long period of time that no torque is applied to the vehicle wheels. It is to be understood that this novel braking device can be utilized with either a manually shiftable transmission or an automatic type transmission.

The object of this invention is to provide a braking means located on either the propeller shaft or the pinion input to the rear axle which effects rapid synchronization of the relatively rotating axle elements. This brake is automatically controlled to be operative to brake the propeller shaft when a shift is made from low speed ratio to high speed ratio.

Another object of this invention is to provide a mechanism which enables torque to be delivered to the axle for a maximum period of time before and after an axle shift is made.

These and other objects and advantages will become more apparent from the following detailed description of the device and from the accompanying drawings.

Figure 1 is a diagrammatic illustration of the automatic braking device for the propeller shaft to facilitate shifting of the axle.

Figure 2 shows the shifting linkage and the motor means to actuate the linkage.

Figure 7:
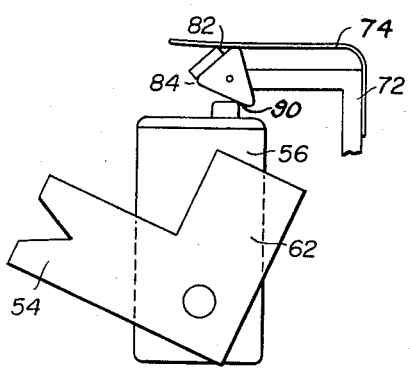
Figure 8:
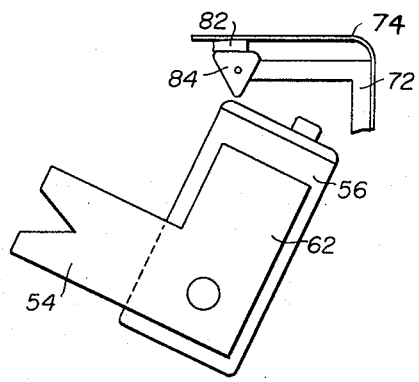
Figure 9:
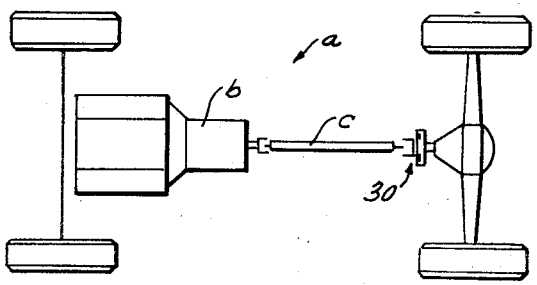

Figures 5, 6, 7, and 8 show the shifting means in different stages of operation, and Figure 9 illustrates the schematic arrangement of the several elements in a vehicle arrangement.

Briefly, this device operates as follows: In shifting the axle from low speed ratio to high speed ratio, the propeller shaft and input pinion of the axle must be rapidly reduced in speed so that synchronous rotation can be effected between the two members to be clutched together to obtain the high speed ratio. This retardation is achieved by placing a brake on the propeller shaft or on the axle input pinion, which is energized whenever the axle is shifted from low speed ratio to high speed ratio. The brake is controlled by an electrical circuit which is described in the following manner.

Figure 1 shows a circuit 10 having a source of power 11 which can be a storage battery or any other suitable source. A shift control switch 12 is movable to either a high speed ratio position or a low speed ratio position and controls the direction of rotation of a reversible electric motor 13. This switch is either manually or automatically operable when the axle is used in conjunction with a standard or manually shiftable transmission and operated automatically when utilized with an automatically shiftable transmission. The motor 13 is of the reversible type having field windings 14, 15 and is connected to drive the axle shifting mechanism which is shown in detail in Figure 2, the structure and operation of which will be explained hereafter. Conductors 16 and 17 connect opposite terminals of switch 12 to contacts 20 and 22, respectively, of switch 18. Conductors 24 and 26 connect switch contacts 20 and 22, respectively, to the field windings 14, 15, respectively, of motor 13 and a conductor 28 connects the motor to ground. The switch 18 is a limit type switch with contacts 20 and 22 disposed at opposite ends of the longitudinal travel of nut 44 so that when the nut reaches a predetermined position the appropriate contact is opened and the motor is de-energized.

A brake 30 is comprised of an electromagnetic coil portion 32 fixed to the axle housing and a rotatable element 34 which is attached to a propeller shaft and disposed adjacent the portion 32. Figure 9 illustrates the arrangement in a vehicle "a" having a transmission "b" and a propeller shaft "c." A conductor 36 connects the brake portion 32 with the conductor 17 and a conductor 38 connects brake portion 32 with a control means 40. A circuit breaker 33 is provided to protect from any circuit overload condition.

In some applications of a wide speed ratio range two speed axle, it might be desirable to provide a clutch operated switch, not shown in the drawing, in series relationship with the portion 28 of the brake and the control means 40. This would necessitate depressing the clutch pedal before the propeller shaft brake could operate. The inertia of the elements to be braked by the shaft brake is less when the clutch is disengaged because disengagement of the clutch releases the engine from the train of elements to be retarded by the shaft brake.

Referring to Figures 1 and 2, the aforementioned motor 13 drives screw 42 upon which is rotatably threaded a nut member 44. The nut member 44 is moved longitudinally when the screw member is rotated and the direction of longitudinal movement of the nut is determined by the direction of rotation of the screw member. The nut member 44 has attached thereto a radially directed pin 46 which is received between projecting finger portions 50 of a yoke 48; the bracket is fixedly attached to arm 54 of a bell-crank 52.

A lever 56 is controllably connected to bell-crank 52 by a torsion spring 58 which has an upturned end 60 attached to an arm portion 62 of bell-crank 52 and end 64 of the spring 58 is suitably attached to lever 56. This arrangement provides a resilient connection between bell-crank 52 and lever 56 so that when bell crank 52 is rotated a given amount, the lever 56 will also rotate, provided there is not too much resistance to the rotation of lever 56, in which case the connection will yield due to the spring connection.

Figure 3:
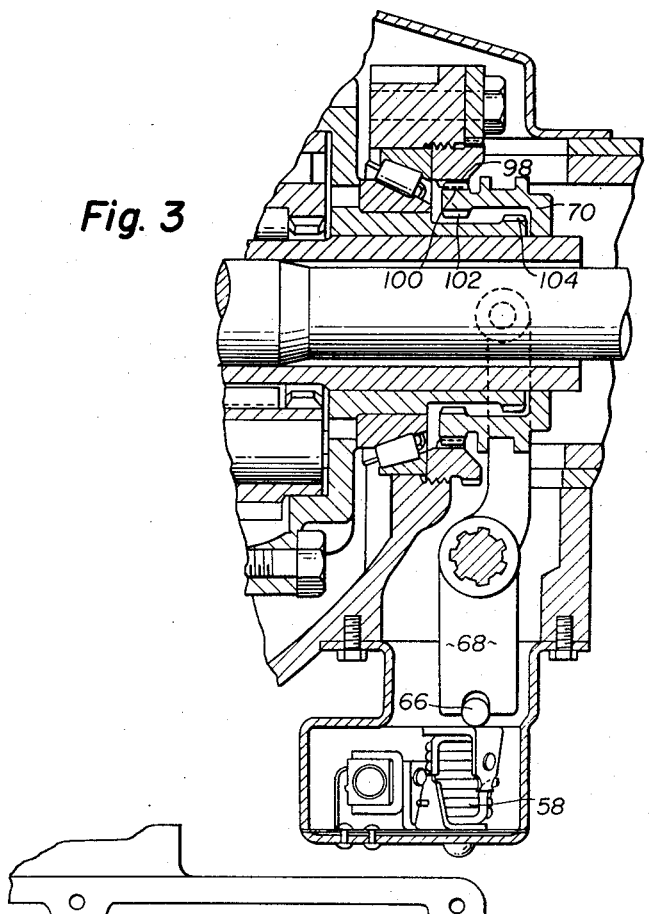
Figure 3 shows the shifting linkage in assembly with the shiftable sleeve portion of the rear axle.

Attached to lever 56 is a connection 66 of the swivel barrel type, shown in Figure 3, with a lever 68 adapted to be oscillatible between two extreme positions for shifting sleeve 70 of the two speed axle.

Figure 4:
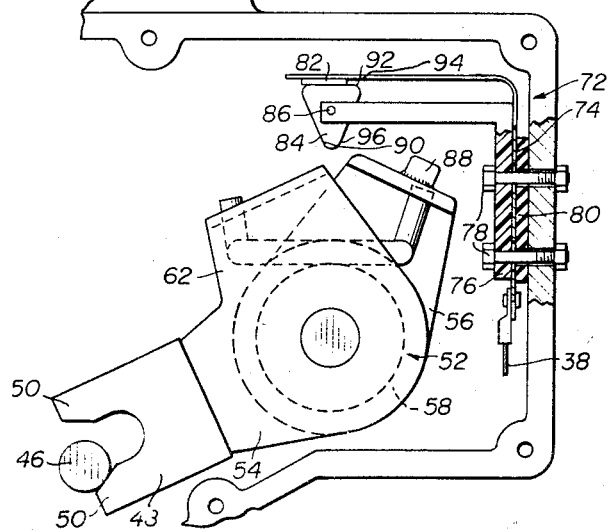
Figure 4 illustrates the one-way brake switch in assembly with the shifting means.
Figure 5:
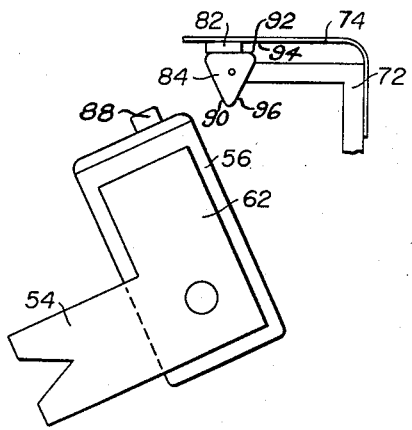
Figure 6:
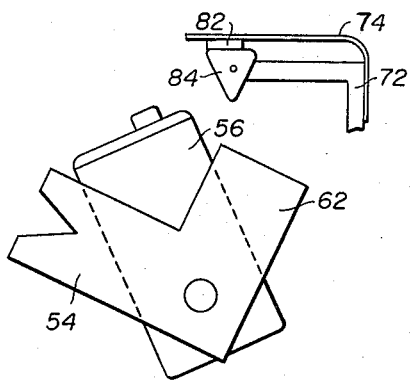

Referring to Figure 4, the conductor 38 is connected to an arm 74 of a one-way switch 72. Secured to the housing by screws or bolts 78 is a bracket 76 which is made of Bakelite, nylon, or any other suitable insulating material. An insulating plate 80 is positioned between the arm 74 and the housing to insulate the arm 74 from the housing. Disposed at one end of the arm 74 is a switch contact plate 84 which is pivoted on bracket 76 at 86. An insulating pad or block 82 is attached to switch contact 84 and serves to insulate contact plate 84 from the arm 74. Arm 74 is made of hard copper or bronze and is resiliently biased against the pad 82.

Lever 56 has mounted thereon a copper contact 88 which strikes the contact 84 whenever lever 56 is oscillated. As viewed in Figure 4, when the lever 56 is rotated in a clockwise direction, the contact 88 will strike contact 84 at 90 and rotate contact 84 counterclockwise until surface 92 contacts surface 94 with a definite wiping action, as shown in Figure 7. When the lever 56 moves further in a clockwise direction, the contact 88 clears contact 84 and contact 84 returns to its normal position due to the biassing action of arm 74, as viewed in Figure 8. When the lever 56 is rotated in a counterclockwise direction, as viewed in Figure 4, the contact 88 will strike contact 84 at 96 and rotate contact 84 sufficiently to allow contact 88 to pass. In this direction of movement, the circuit is not closed because there is no contact at 92, 94. The lever 56 is grounded to provide an operative circuit when the switch 72 is closed. It is to be noted that when lever 56 is moving in a direction to close switch 72, there is a definite wiping contact both at 88, 90, and at 92, 94. This type circuit opening and closing action is very desirable in an oil bathed enclosure such as is employed in this mechanism. Also, the circuit is always opened at 84, 88 and not at 92, 94, which is advantageous because the contacts 84 and 88 are made of copper, while the arm 74 is made of bronze and breaking the circuit between the contacts which are of the best conductive material, reduces burning and pitting of the contact points.

A typical operating cycle is described as follows: Assume the axle is in low speed ratio and when the proper speed is attained, it is desired to shift to high speed ratio as rapidly as possible after the shift is initiated. While torque is being applied to the rear axle, low speed ratio clutch teeth 98, 100 will remain in engagement even though the shift control switch 14 has been pre-selected to a "high" position. Pre-selection is defined as selecting a different speed ratio while the axle is transmitting torque in another speed ratio. When the selector switch 12 is moved to the "high" position, either manually or automatically, and the axle is still transmitting torque in the low speed ratio, the shifting mechanism moves from the position shown in Figure 6 to the position shown in Figure 7. That is, motor 13 is actuated, which moves nut member 44 upward, as viewed in Figure 2, which in turn, rotates crank 52 in a clockwise direction. Lever 56 remains in the low speed ratio position because the clutch teeth 98, 100 are not free to disengage until the driving torque has been interrupted.

Next, the driving torque is interrupted by closing the engine throttle and as soon as the driving torque is sufficiently diminished, the lever 56 moves clockwise as viewed in Figure 7 to the position shown in Figure 8. That is, when the driving torque is interrupted, the clutch teeth 98, 100 are free to be disengaged but clutch teeth 102, 104 cannot be engaged in the high speed ratio position until the clutch teeth 102, 104 are synchronized. The lever 56 remains in the neutral position only for that short period of time which is consumed to effect the synchronization of clutch teeth 102, 104, and this synchronization is accomplished by the energization of the brake 30 to reduce the propeller shaft speed. When the clutch teeth 102, 104 are synchronized, lever 56 moves to the position indicated in Figure 8. The time required to complete this shift is less than the time necessary to shift the transmission.

A closer observation of this portion of the operating cycle brings out the purpose and function of the switch 72. When the lever 56 moves to the neutral position from the low speed ratio position, the contact 88 strikes contact 84 and rotates 84 until there is contact at 92, 94. This provides a closed circuit and results in energization of brake 26 to retard the speed of the propeller shaft. As soon as teeth 102, 104 are synchronized, lever 56 completes its clockwise movement and breaks the circuit by opening the switch 72 at 84, 88.

When it is desired to shift from high speed ratio to low speed ratio, the shift control switch 12 is moved to the "low" position while torque is being applied to the axle in the high speed ratio. It is to be noted that Figure 1 illustrates the mechanism at this particular phase of the operating cycle; that is, Figure 1 shows the mechanism after the shift control switch has been pre-selected to "low" and the nut 44 has moved to the low position but with the axle still transmitting torque in the high speed ratio. The shift is completed by closing and opening the throttle as quickly as possible, or by releasing and engaging the clutch very rapidly with the throttle open. In effecting this shift, it is not desired to have the brake 32 applied. Therefore, when lever 56 moves from high speed ratio to low speed ratio, the contact 88 strikes 84 at 96 and rotates 84 far enough for the contact 88 to clear contact 84 and at no time during this phase of the cycle is the circuit closed by contacting points 92 and 94.

It is obvious, therefore, that the structure shown and described herein, provides an automatic braking means to facilitate rapid shifting in a two speed axle from the low speed ratio to the high speed ratio.

While the present invention has been described in connection with certain embodiments, it is to be understood that the foregoing description is merely exemplary and that the concept of this invention is susceptible of numerous other modifications, variations and applications which will be apparent to persons skilled in the art. The invention is to be limited therefore only by the broad scope of the appended claims.

What we claim is:

1. In a vehicle having a propeller shaft, a multi-speed transmission, a two speed axle having high and low speed ratios, braking means interposed between said transmission and said axle, said braking means being operative to retard the speed of said propeller shaft when said axle is shifted from said low speed ratio to said high speed ratio and said brake being released when said shift to said high speed ratio is effected.

2. In a vehicle, a multi-speed ratio torque transmitting means, shifting means to shift said torque transmitting means to selected speed ratios, input means to said torque transmitting means and braking means operatively connected to said input means and actuated by said shifting means to retard the speed of said input means when said torque transmitting means is being shifted from a low speed ratio to a high speed ratio.

3. In a vehicle, a multi-speed transmission, a multi-speed ratio axle, shifting means to shift said axle to selected speed ratios, a propeller shaft connecting said transmission to said axle, and braking means operatively connected to said propeller shaft and actuated by said shifting means to reduce the speed of said propeller shaft when said axle is in a neutral condition during the shift of said axle from a low speed ratio to a high speed ratio.

4. In a vehicle, an engine, a multi-speed transmission, a multiple speed ratio axle, a propeller shaft connecting said transmission to said axle, control means to select a given axle speed ratio, braking means operatively connected to and controlled by an electric control circuit and operable to retard the speed of said propeller shaft, and switch means being operatively connected to said electric control circuit and said axle control means and being operative to close said electric control circuit and energize said brake when said axle control means is moved to select a higher axle speed ratio.

5. In a vehicle, an engine, a multi-speed transmission, a dual speed ratio axle, a propeller shaft connecting said transmission to said axle, an axle gear shift electric selector switch, a one-way switch, said switches being connected in series relationship, axle gear shifting means including an arm operable to change said axle speed ratio, arm actuating means, a lever, a torsional spring means interposed between said arm and said lever and operable to shift said lever when said arm is actuated, said axle shifting means being movable to low speed ratio, neutral and high speed ratio positions, said one-way switch being closed when said lever is moved from said low speed ratio to said neutral position, and braking means operable to retard said propeller shaft and being energized when said one-way switch is in a closed position and said selector switch is in a pre-selected position.

6. In a vehicle, a vehicle propulsion means, multiple speed ratio axle means, means to drivingly connect said propulsion means and said axle means, said axle means having at least a high speed ratio and a low speed ratio, shifting means to shift said axle to either of said ratios, braking means disposed between said propulsion means and said axle means and actuated by said shifting means to brake said connecting means when said axle means is shifted from said low speed ratio to said high speed ratio to effect a smooth and rapid shift to said high speed ratio.

7. In a vehicle, a vehicle propulsion means, a multiple speed ratio axle, means drivingly connecting said propulsion means and said axle, said axle having at least a high speed ratio and a low speed ratio, shifting means to shift said axle to either of said ratios, and braking means disposed between said propulsion means and said axle means and actuated by said shifting means to retard the speed of said connecting means when said axle is shifted from said low speed ratio to said high speed ratio.

8. Control means for a propeller shaft braking means comprising a propeller shaft, electrically operable brake means operable to selectively brake said propeller shaft, a multiple speed ratio axle means drivingly connected to said propeller shaft, said axle means having at least a high speed ratio and a low speed ratio, electric motor means operable to shift said axle means to either of said speed ratios, circuit means to control said motor comprising an axle shift control switch, circuit energizing means, a one-way operable switch connected by conductor means to said shift control switch, said one-way switch being in an open circuit position when said axle means is shifted from said high speed ratio to said low speed ratio and said one-way switch being moved to a circuit energized position when said axle means is shifted from said low speed ratio to said high speed ratio to thereby energize said brake means.

9. In a vehicle, a multiple speed ratio torque transmitting means, braking means operable to synchronize relatively rotatable members in said torque transmitting means when said torque transmitting means is shifted from a low speed ratio to a high speed ratio, electrically actuated motor means to effect said shift to a different speed ratio, and control means operated by said motor means to energize said braking means when said axle torque transmitting means is shifted from said low speed ratio to said high speed ratio.

10. In a vehicle, a multiple speed ratio rear axle, input means to said rear axle, shifting means to shift said axle from one speed ratio to another speed ratio, braking means selectively operable to brake said input means, energizing means operable to effect engagement of said braking means and means operable when said axle is shifted from a low speed ratio to high speed ratio to render said energizing means operable to engage said braking means.

11. An axle shift synchronizing means comprising a multiple speed ratio axle means, an input means to said axle means, braking means operable to selectively brake said input means, a motor means, means operated by said motor means to selectively shift said axle from one speed ratio to another speed ratio, and means operated by said shifting means to energize said braking means when said axle is shifted from said low speed ratio to said high speed ratio.

12. In a vehicle, a multi-speed transmission, a multiple speed ratio axle means, means connecting said transmission and said axle means and comprising input means to said axle means, means to selectively shift said axle from a high speed ratio to a low speed ratio and from said low speed ratio to said high speed ratio comprising a motor means, threaded means driven by said motor means, nut means threadingly engageable with said threaded means and selectively, longitudinally, movable thereby, linkage means operably engageable with said nut means, switch means operably engaged with said linkage means, energizable braking means operable to brake said input means to said axle means, said linkage means operable to shift said axle from one of said speed ratios to the other said speed ratio and said braking means being energized when said linkage means is moved from said low speed ratio to said high speed ratio.

13. A device, according to claim 12, wherein said motor means is de-energized when said nut means reaches a predetermined position to effect said low speed ratio and another predetermined position to effect said high speed ratio.

14. A device, according to claim 12, wherein said switch means is connected in series with said energizable brake means.

15. A device, according to claim 12, wherein an axle shift selector switch is operable to select either said low speed ratio or said high speed ratio.

16. A device, according to claim 12, wherein said brake means comprises an energizable coil fixed to a housing of said axle means and a disc means connected to said input means whereby said disc means and said input means are retarded when said coil is energized.

References Cited in the file of this patent

UNITED STATES PATENTS

| | | |
|---|---|---|
| 1,541,240 | Barkeij | June 9, 1925 |
| 2,113,860 | Sanford et al. | Apr. 12, 1938 |
| 2,462,779 | Russell | Feb. 22, 1949 |
| 2,475,679 | Sinclair | July 12, 1949 |
| 2,586,056 | Kling et al. | Feb. 19, 1952 |
| 2,610,518 | Goedeke et al. | Sept. 16, 1952 |
| 2,616,009 | Roeser | Oct. 28, 1952 |
| 2,695,531 | Thomas et al. | Nov. 30, 1954 |
| 2,695,983 | Price | Nov. 30, 1954 |